Aug. 6, 1929.  G. A. MITCHELL  1,723,294
TILTING HEAD FOR CAMERA TRIPODS
Filed Feb. 23, 1921
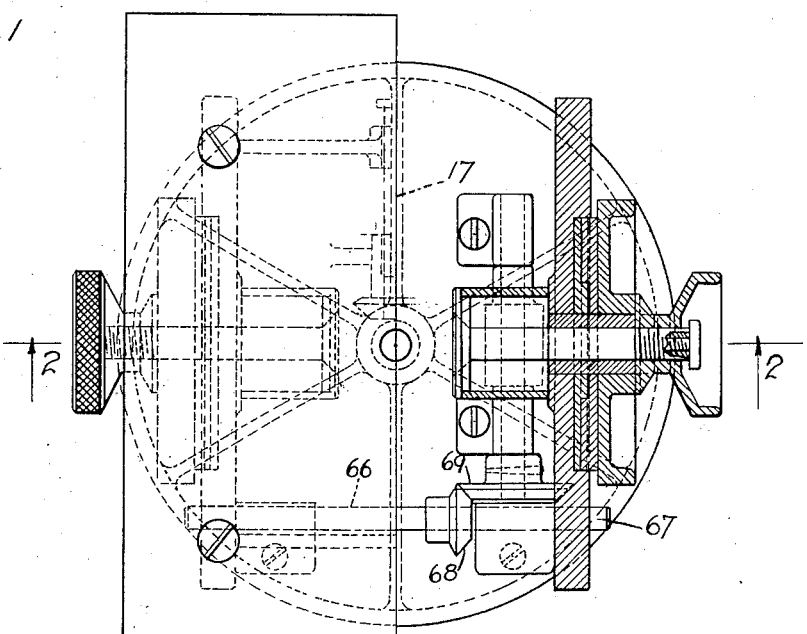
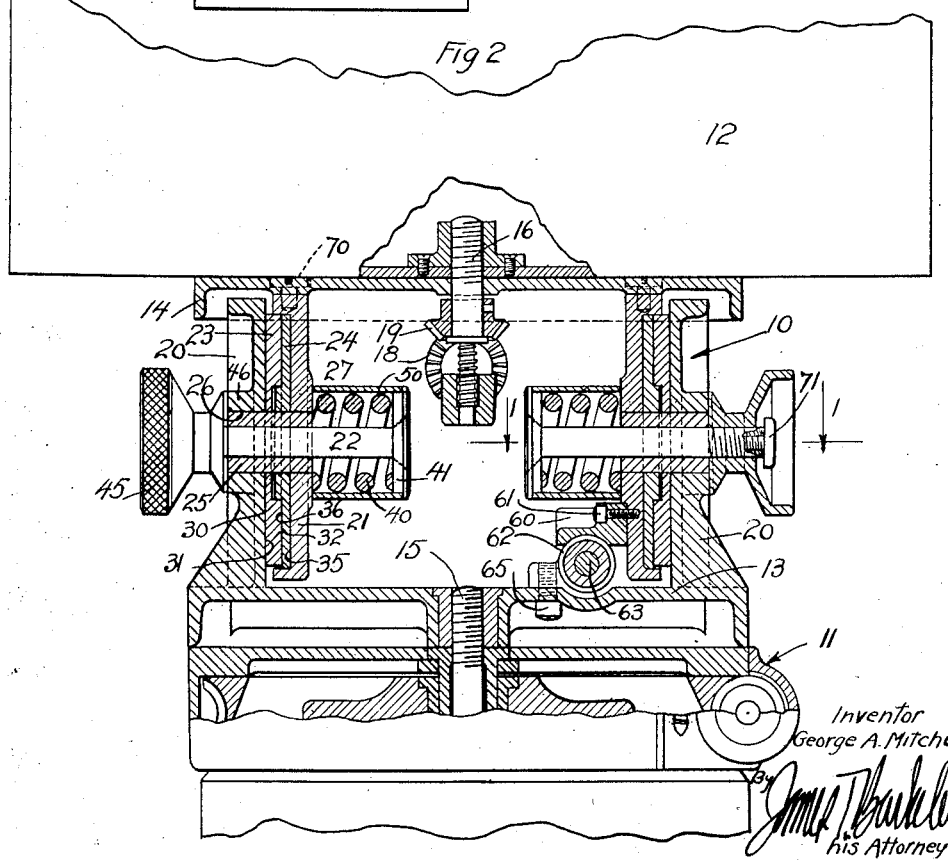
Inventor
George A. Mitchell
By
his Attorney Patented Aug. 6, 1929.

1,723,294

UNITED STATES PATENT OFFICE.

GEORGE A. MITCHELL, OF LOS ANGELES, CALIFORNIA, ASSIGNOR TO MITCHELL CAMERA CO., OF LOS ANGELES, CALIFORNIA, A CORPORATION OF CALIFORNIA.

TILTING HEAD FOR CAMERA TRIPODS.

Application filed February 23, 1921. Serial No. 447,286.

The invention has to do with a tilting head for a camera tripod, or the like, and it may be stated that an object of the invention is to provide a simple effective device of this character which is strong and solid and which will not become loose and inaccurate with use.

Tilting heads ordinarily used for camera tripods, and the like, are generally constructed with free pivot joints about which the tilting action takes place, and are provided with mechanism for causing tilting action. This tilting or operating mechanism comprises a worm gear mechanism, or the equivalent thereof, and is arranged so that it acts as lock means to hold the head in any set position. In practice tilting heads are only operated, to any great extent, through small angles and practically always in about the same range of positions. Such operation causes excessive wear to take place at a certain portion of the worm gear mechanism allowing looseness, or play, to develop in the entire head. To overcome this looseness, it is common in practice to wedge or clamp the camera in the desired position when accuracy is necessary. Such operation is more or less inconvenient and is particularly wasteful of time.

By the present invention is provided a tilting head which effectively overcomes the above mentioned and other difficulties common to devices of this character. In the present device means is provided for tilting or operating the head, and means is provided for holding the head in any desired position. These two means are entirely separate and independent of each other both in operation and construction. The means for holding the head in position is arranged at the pivotal joint of the head to directly engage and hold the tilting head proper. The tilting or operating mechanism is so arranged in the head that it can only cause movement of the tilting head proper through and against the resistance of the holding means.

Another object of the invention is to provide such a mounting as will eliminate endwise play of the tilting head-play of the head longitudinally of the tilting axis. This elimination of endwise play is also accomplished through the same mounting means which eliminates loose play of the head rotatively about its tilting axis.

Further objects of the invention and the means by which I effect these objects are explained in the following specification wherein I describe a preferred embodiment of the invention and throughout which reference is had to the accompanying drawings, in which—

Fig. 1 is a plan view of the tilting head showing a portion of it in section, being a view taken as indicated by line 1—1 on Fig. 2; and Fig. 2 is a vertical detail sectional view of the head taken as indicated by line 2—2 on Fig. 1.

Throughout the drawings numeral 10 designates the tilting head, provided by the present invention, which is mounted on the tripod head 11, and on which is mounted or carried the camera 12. The tilting head 10 comprises, generally, a base 13 adapted to firmly fit on the tripod head 11 and adapted to be attached to the tripod head 11 by a screw 15 extending upwardly from the tripod head for that purpose, as shown in Fig. 2 of the drawings, and a head 14 adapted to receive and carry the camera 12. The head 14 has a screw 16 extending upwardly from it to screw thread into a suitable screw threaded part of the bottom of the camera 12 to hold the camera firmly and securely in place. The screw 16 is arranged to be operated from a horizontal shaft 17, that extends from one side of the device through suitable bevel gears 18 and 19. It will be readily understood how the shaft 17 may be rotated by a suitable handle (not shown) to cause the screw 16 to either screw-thread into or out of the bottom of the camera. In accordance with the present invention, two standards or brackets 20 extend upwardly from the base 13 and two brackets 21 extend downwardly from the head 14. Brackets 20 are preferably spaced a considerable distance apart on the base 13, and the brackets 21 are arranged on the tilting head 14 so that they are between the two base brackets 20. Adjacent brackets 20 and 21 form pairs, and the brackets of each pair are connected by a central bolt 22, and are provided at their adjacent faces with friction washers 23 and 24. Brackets 20 and 21 do not directly engage the bolts 22, but bushings 25 are carried in the base brackets 20 and the head brackets 21 are mounted on those bushings. Bolts 22 have sliding fits in the bushings, and the brackets are so mounted on the bushings that the head brackets may turn about the axis of the bushings but without any radial looseness. The bushings provide radial bearings of some considerable size and area for the brackets and the tilting head is thus pivotally mounted in such a manner as to have no looseness develop.

In each of the pivotal connections the friction washer 23 is carried concentrically on the bushing 25, and is formed with a flat face 30 to bear against the flat face 31 of the bracket 20, and is formed with a raised part having a face 32 adapted to engage the other friction washer 24. The friction washer 24 is carried concentrically on the bushing 25, and is formed to tightly fit and be carried in a socket or recessed part 35 formed in the bracket 21. The friction washer 24 is formed with a recessed part, the face 36 of which is adapted to engage the face 32 of the washer 23. It will be noted that the washers 23 and 24 engage or contact with each other only at the faces 32 and 36 and that these faces are formed at outermost parts of the washers. This construction provides particularly effective and durable friction surfaces, on the washers 23 and 24. It will be understood, of course, that the friction washers may be made of any suitable material or combination of materials; for instance they may be suitable metal members or they may be fiber members.

The brackets 20 and 21 of each pair are so spaced, and the washers 23 and 24 are of such thicknesses, that when no external forces are applied to the brackets the friction surfaces 32 and 36 of the washers engage each other but not with sufficient force or pressure to set up enough friction to prevent the head 14 from being easily turned. In other words, the parts are so arranged that the friction faces engage lightly or with a sliding fit when no pressure is applied to them. In order that the friction surfaces 32 and 36 of each pair may be pressed with sufficient pressure to prevent by friction any undesirable rotational looseness of the tilting head, a spring 40 is arranged in connection with each bolt 22. Each spring 40 is mounted around the head end of the corresponding bolt 22, between a washer 41 carried at the head of the bolt and the bracket 21. A hand nut 45 is carried on the screw-threaded end of each bolt 22, to engage the hub 46 formed on the bracket 20. This hand nut 45 may be normally tightened on the bolt until the spring presses the brackets and their frictional washers together with the required pressure. In practice the hand nuts 45 are usually kept in such adjustment on the bolts that the springs exert some pressure to force the brackets and the friction washers together; and that pressure is sufficient to develop enough friction to keep the tilting head from moving in any loose play, although the tilting head can be moved by the positive tilting means hereinafter described. It will be understood, of course, that the degree of pressure thus developed by each spring will depend upon the stiffness of the spring and also upon the position to which the hand nut 45 is set up.

To provide means for positively setting or tightening the pivotal joints in a manner so that they are not yieldingly held through the medium of the springs 40, sleeves 50 are arranged around the springs 40 between the brackets 21 and the washers 41. The sleeves 50 are of such length that they are ordinarily loose between the brackets 21 and washers 41 but can be made to be tightly held between the brackets 21 and washers 41 by sufficient tightening of the nuts 45. It will be understood that when the nuts 45 are tightened in this last mentioned manner that the washers 23 and 24 are positively clamped between the brackets. The bushings 25 are, in practice, made sufficiently short that they do not interefere with the operation of the friction means in any way. This construction is particularly important in that it provides easily and quickly operable means for positively tightening and setting the pivotal joints.

In practice the springs 40 are selected as to stiffness, and the sleeves 50 are of such lengths, that a comparatively short movement of the hand nuts 45 will change the adjustment from the positive setting described in the last paragraph to the yielding setting described hereinabove. I have described how the friction faces are made to fit comparatively closely even when no pressure is applied to the brackets at all. The pressure of the springs is sufficient to press the friction surfaces of the brackets more closely together, springing the brackets of each pair toward each other by the very slight amount necessary for the development of additional friction pressure. The actual springing movements of the brackets are very small, even when the brackets are positively clamped together by pressure exerted through the sleeve 50. Consequently a comparatively small movement of the hand nut 45 will move the bolt head washer 41 from a position where it bears on the end of sleeve 50 and clamps the brackets positively together, to a position where the bolt head washer 41 is backed off sufficiently that it does not bear against the end of sleeve 50, and the only clamping pressure exerted on the brackets is the pressure generated by spring 40.

Due also to the features of construction which I have pointed out, and due to the fact that the head brackets are pressed respectively in opposite directions to press against their corresponding base brackets, the device has no loose end play in a direction longitudinal of the tilting axis, even when the frictions are so adjusted that the head can be tilted. Even when the pairs of brackets are only clamped together by the pressure of springs 40, it will be noted that there is no longitudinal looseness anywhere in the whole mounting.

As means to operate or tilt the head 14, a worm gear segment 60 is mounted on one of the brackets 21, by means of screw 61, to engage and mesh with a worm gear 62 carried on a shaft 63 rotatably carried in bearing blocks 64 mounted on the base 13 by means of suitable bolts 65. The shaft 63 is adapted to be rotated from a shaft 66, provided with squared ends 67 to receive a suitable operating handle (not shown), through bevel gears 68 and 69. This manner of operating shaft 63, or in other words the tilting mechanism, is provided so that the head can be conveniently operated from either side of the apparatus. In practice when the pivot joints are tightened through, or held under pressure by, the springs 40 it is possible to manipulate or operate the head by the operating mechanism just described. However, it will be understood how any operation of the tilting, by the operating mechanism, is through the pivot joint, or in other words, is through the frictional joint formed by washers 24 and 23, and that therefore looseness or inaccuracy of the operating mechanism does not effect, or interfere with, the movement of the tilting head. That is, the various elements of the device are so arranged that the means for holding the tilting head in position, or against movement, (the friction washers and clamping means), is intermediate of the operating means, which comprises the worm gear 62 and worm segments 60, and the tilting head 14, thereby being in position to prevent looseness of the operating mechanism from being transmitted to or being present at the tilting head. This is a particularly important feature from a practical operating standpoint.

The exact design and construction of parts employed in the device may be varied considerably without departing from the spirit of the invention, except as limited by the following claims; for instance, the showing of friction means at both of the pivot joints, the showing of the brackets 20 as integral parts with the base 13, the showing of the brackets 21 as connected to the tilting head 14 by screws 70, and other similar structural features disclosed in the drawings might be altered or changed to suit particular requirements without departing from the spirit or the scope of this invention. Further, refinements such as the provision of set screws 71 at the ends of the pivot bolts 22 to prevent removal of the nuts 45 from the pivot bolts, the particular arrangement herein set forth for operating the worm gear 62, etc. are typical of minor refinements of construction which may be embodied in the device through the exercise of mechanical skill.

Having set forth only a preferred embodiment of the invention I do not wish to limit or restrict myself to the particular details hereinabove set forth but wish to reserve to myself any changes or modifications that may appear to those skilled in the art or that may fall within the scope of the following claims.

Having described a preferred form of my invention, I claim:

1. In a camera mounting, a base, a camera carrying head pivotally mounted on the base, interengaging brackets on the head and base, a bolt passing through the brackets with a head at one end at one side of one bracket and a nut at the other end bearing on the opposite side of the other bracket, a spring between the bolt head and the first mentioned bracket to yieldingly press that bracket against the other, and a sleeve surrounding the spring and adapted to bear endwise on said bracket and the bolt head to positively press said bracket against the other when the nut is set up.

2. In a camera mounting, a base, two spaced brackets thereon, a tilting camera carrying head with two spaced brackets engaging and adapted to frictionally press each against one of the base brackets, and the two head brackets engaging against the two base brackets in opposite directions, and means to press together the engaging pairs of base and head brackets.

3. In a camera mounting, a base, two spaced brackets thereon, a tilting camera carrying head with two spaced brackets engaging and adapted to frictionally press each against one of the base brackets, and the two head brackets engaging against the two base brackets in opposite directions, and means to press together the engaging pairs of base and head brackets, said means embodying springs pressing against one bracket of each pair.

4. In a camera mounting, a base, two spaced brackets thereon, a tilting camera carrying head with two spaced brackets engaging and adapted to frictionally press each against one of the base brackets, and the two head brackets engaging against the two base brackets in opposite directions, and means operable selectively to press together the engaging pairs of base and head brackets either yieldingly or positively, said means embodying bolts passing through the pairs of brackets with heads at one of their ends and nuts at the other ends, springs between the bolt heads and one bracket of each pair, and sleeves extending between the bolt heads and the last mentioned brackets and adapted to be tightly clamped between the brackets and the heads when the nuts are set up.

In witness that I claim the foregoing I have hereunto subscribed my name this 30th day of August, 1920.

GEORGE A. MITCHELL.